United States Patent
Shen et al.

(10) Patent No.: US 11,118,675 B2
(45) Date of Patent: Sep. 14, 2021

(54) SHIFT CONTROL METHOD AND DEVICE

(71) Applicant: GREAT WALL MOTOR COMPANY LIMITED, Hebei (CN)

(72) Inventors: Zhiyuan Shen, Hebei (CN); Philip-Thomas Harris, Hebei (CN); Haoyong Lv, Hebei (CN); Peng Jia, Hebei (CN); Wenjian Liu, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 17/059,728

(22) PCT Filed: May 31, 2019

(86) PCT No.: PCT/CN2019/089396
§ 371 (c)(1),
(2) Date: Nov. 30, 2020

(87) PCT Pub. No.: WO2019/228484
PCT Pub. Date: Dec. 5, 2019

(65) Prior Publication Data
US 2021/0215246 A1    Jul. 15, 2021

(30) Foreign Application Priority Data

May 31, 2018   (CN) .......................... 201810551279.0

(51) Int. Cl.
*F16H 59/68* (2006.01)
*F16H 59/44* (2006.01)
(Continued)

(52) U.S. Cl.
CPC ............ *F16H 59/68* (2013.01); *F16H 59/44* (2013.01); *F16H 59/70* (2013.01); *F16H 59/72* (2013.01);
(Continued)

(58) Field of Classification Search
CPC .......... F16H 59/44; F16H 59/66; F16H 59/70; F16H 59/72; F16H 59/74;
(Continued)

(56) References Cited

U.S. PATENT DOCUMENTS

2006/0122031 A1\* 6/2006 Preisner ............... B60W 10/113
477/80
2012/0029777 A1    2/2012 Tao et al.
(Continued)

FOREIGN PATENT DOCUMENTS

CN        101144533 A    3/2008
CN        102606726 A    7/2012
(Continued)

OTHER PUBLICATIONS

International Search Report for PCT/CN2019/089396 dated Aug. 26, 2019, 7 pages.
(Continued)

*Primary Examiner* — Edwin A Young
(74) *Attorney, Agent, or Firm* — Nixon Peabody LLP; Jeffrey L. Costellia

(57) ABSTRACT

A method for controlling gear shifting, including: acquiring a current gear-shifting parameter of the vehicle (101); according to the current gear-shifting parameter and a preset target rotational speed, determining a gear-shifting inputted rotational speed (102); and when a rotational speed of the vehicle reaches the gear-shifting inputted rotational speed, controlling a shifting fork to start up a gear-shifting operation (103). The method for controlling gear shifting presets the target rotational speed of the gears, and, according to the current gear-shifting parameter of the vehicle that is acquired in real time and the preset target rotational speed, inversely calculates the gear-shifting inputted rotational speed, whereby the gear-shifting inputted rotational speed is (Continued)

an accurate gear-shifting inputted rotational speed that matches with the current condition of the vehicle. When the rotational speed of the vehicle reaches the gear-shifting inputted rotational speed, the shifting fork is controlled to start up a gear-shifting operation, which can realize the accurate gear shifting of the vehicle, which greatly improves the stability of the vehicle when a dual-clutch automatic transmission is performing gear shifting.

8 Claims, 5 Drawing Sheets

(51) Int. Cl.
    *F16H 61/04*     (2006.01)
    *F16H 59/72*     (2006.01)
    *F16H 59/70*     (2006.01)
    *F16H 59/74*     (2006.01)

(52) U.S. Cl.
    CPC ............. *F16H 59/74* (2013.01); *F16H 61/04* (2013.01); *F16H 2059/6807* (2013.01); *F16H 2059/702* (2013.01); *F16H 2059/706* (2013.01); *F16H 2059/725* (2013.01); *F16H 2306/20* (2013.01)

(58) Field of Classification Search
    CPC ....... F16H 2059/6807; F16H 2059/702; F16H 2059/706; F16H 2059/725; F16H 61/04; F16H 2306/20
    See application file for complete search history.

(56) References Cited

U.S. PATENT DOCUMENTS

| | | | |
|---|---|---|---|
| 2015/0080177 A1* | 3/2015 | Sakamoto | F16D 48/062 477/79 |
| 2017/0101101 A1 | 4/2017 | Cho et al. | |
| 2018/0363776 A1* | 12/2018 | Shimozawa | F16H 3/091 |

FOREIGN PATENT DOCUMENTS

| | | |
|---|---|---|
| CN | 103148207 A | 6/2013 |
| CN | 104121356 A | 10/2014 |
| CN | 105370872 A | 3/2016 |
| CN | 103244663 B | 5/2016 |
| CN | 105626846 | 6/2016 |
| CN | 105626846 A | 6/2016 |
| CN | 106286813 A | 1/2017 |
| CN | 107202161 A | 9/2017 |
| CN | 108061155 A | 5/2018 |
| EP | 1850038 | 10/2007 |
| EP | 3139070 A1 | 3/2017 |
| JP | 2015-209156 | 11/2015 |
| JP | 2015209156 A | 11/2015 |
| RU | 2 362 074 | 7/2009 |
| RU | 2 607 907 | 1/2017 |
| WO | 2013051627 | 3/2015 |

OTHER PUBLICATIONS

CN Office Action for CN 201810551279.0 dated Oct. 24, 2019, 11 pages.
CN Office Action for CN 201810551279.0 dated Apr. 3, 2020, 12 pages.
CN Search Report for CN 201810551279.0 dated Oct. 14, 2019, 4 pages.
CN Search Report for CN 201810551279.0 dated Mar. 27, 2020, 4 pages.
CN Grant Notice for CN 201810551279.0 dated Jun. 18, 2020, 4 pages.
CN Granted Search Report for CN 201810551279.0 dated May 31, 2020, 2 pages.
Russian Office Action (Application No. 2020140963) dated May 14, 2021.
Supplementary European Search Report for EP-19810696.5, dated Jun. 24, 2021.

* cited by examiner

SHIFT CONTROL METHOD AND DEVICE

CROSS-REFERENCE TO RELATED APPLICATIONS

This application is the National Phase of International Application PCT/CN2019/089396, filed May 31, 2019, which designated the United States. This application also includes a claim of priority under 35 U.S.C. § 119(a) and § 365(b) to Chinese Application No. 201810551279.0 filed May 31, 2018, the entirety of which is hereby incorporated by reference.

TECHNICAL FIELD

The present disclosure relates to the technical field of automatic control, and particularly relates to a method and device for controlling gear shifting.

BACKGROUND

The gear-shifting process of a dual-clutch automatic transmission comprises gear pre-engagement, the oil charging and the torque interaction between the clutches, and the subsequent rotational-speed synchronization. The point when the driver and the passengers can perceive the obvious change of the acceleration is the moment when the torque interaction has been completed. Therefore, as a common sense, generally the gear-shifting process comprises gear pre-engagement and the oil charging and the torque interaction between the clutches.

In the prior art, for determining the time point when a dual-clutch automatic transmission performs gear-shifting operation, generally the rotational speed or vehicle speed at the starting moment of the gear shifting is rated, and when the rotational speed of the dual-clutch automatic transmission or the vehicle speed reaches the rotational speed or vehicle speed that is in advance rated, the gear shifting fork of the dual-clutch automatic transmission is controlled to perform the gear engaging operation, to start up the gear-engaging process, to then automatically complete the process of the gear pre-engagement and the oil charging and the torque interaction between the clutches.

However, the applicant has found when studying the above solution that, in the prior art, merely the rotational speed or vehicle speed at the starting moment of the gear shifting is rated, and the rated rotational speed or vehicle speed usually cannot fit to the practical rotational speed or vehicle speed that is required by the gear-engaging process of dual-clutch automatic transmissions. Particularly, in the dynamic process of driving by the driver, the entire process of gear shifting of the dual-clutch automatic transmission generally has a great uncertainty, and rating a fixed gear-shifting rotational speed or vehicle speed for vehicles having different travelling conditions easily results in instability of the vehicles when the dual-clutch automatic transmission is performing gear shifting.

SUMMARY

In view of the above, the present disclosure provides a method and device for controlling gear shifting, to solve or partially solve the problem that when the dual-clutch automatic transmission is performing gear shifting the vehicle is not stable.

To achieve the above object, the technical solutions of the present disclosure are realized as follows:

A method for controlling gear shifting, wherein the method is applied to a vehicle, and the method comprises:
acquiring a current gear-shifting parameter of the vehicle;
according to the current gear-shifting parameter and a preset target rotational speed, determining a gear-shifting inputted rotational speed; and
when a rotational speed of the vehicle reaches the gear-shifting inputted rotational speed, controlling a shifting fork to start up a gear-shifting operation.

Optionally, the step of acquiring the current gear-shifting parameter of the vehicle comprises:
acquiring a first duration T1 corresponding to gear engaging of the shifting fork;
acquiring a second duration T2 corresponding to oil charging of clutches;
acquiring a third duration T3 corresponding to torque interaction between the clutches; and
acquiring an angular acceleration Grad of an output shaft of the vehicle; and the step of, according to the current gear-shifting parameter and the preset target rotational speed, determining the gear-shifting inputted rotational speed comprises:
according to the T1, the T2, the T3, the Grad, a first speed ratio R1 of a current gear of a dual-clutch automatic transmission and a second speed ratio R2 of a target gear of the dual-clutch automatic transmission, determining a gear-shifting rotational-speed variation value ΔRpm;
determining the preset target rotational speed Rpm corresponding to the target gear; and
according to the ΔRpm and the preset target rotational speed Rpm, determining the gear-shifting inputted rotational speed.

Optionally, the step of acquiring the first duration T1 corresponding to the gear engaging of the shifting fork comprises:
acquiring a current working condition of the vehicle; and
according to the current working condition, determining the first duration T1 corresponding to the gear engaging of the shifting fork.

Optionally, the step of acquiring the second duration T2 corresponding to the oil charging of the clutches comprises:
acquiring an oil temperature corresponding to the dual-clutch automatic transmission; and
according to the oil temperature, determining the second duration T2 corresponding to the oil charging of the clutches.

Optionally, the step of acquiring the third duration T3 corresponding to the torque interaction between the clutches comprises:
acquiring a throttle opening of an engine of the vehicle; and
according to the throttle opening of the engine, determining the third duration T3 corresponding to the torque interaction between the clutches.

Optionally, the step of, according to the T1, the T2, the T3, the Grad, the first speed ratio R1 of the current gear of the dual-clutch automatic transmission and the second speed ratio R2 of the target gear of the dual-clutch automatic transmission, determining the gear-shifting rotational-speed variation value ΔRpm comprises:
according to a product of a sum of the T1 and the T2 times the Grad times the R1, obtaining a first variation;
according to a product of an average value between the Grad and an angular acceleration of the output shaft of the target gear times an average value between the R2 and the R1 times the T3, obtaining a second variation, wherein the angular acceleration of the output shaft of the target gear refers to a product of a ratio of the R2 to the R1 times the Grad; and summing the first variation and the second variation, to obtain the gear-shifting rotational-speed variation value ΔRpm.

A device for controlling gear shifting, wherein the device is applied to a vehicle, and the device comprises:

a current-gear-shifting-parameter acquiring module configured for acquiring a current gear-shifting parameter of the vehicle;

a gear-shifting-inputted-rotational-speed determining module configured for, according to the current gear-shifting parameter and a preset target rotational speed, determining a gear-shifting inputted rotational speed; and a shifting-fork controlling module configured for, when a rotational speed of the vehicle reaches the gear-shifting inputted rotational speed, controlling a shifting fork to start up a gear-shifting operation.

Optionally, the current-gear-shifting-parameter acquiring module comprises:

a first-duration acquiring submodule configured for acquiring a first duration T1 corresponding to gear engaging of the shifting fork;

a second-duration acquiring submodule configured for acquiring a second duration T2 corresponding to oil charging of clutches;

a third-duration acquiring submodule configured for acquiring a third duration T3 corresponding to torque interaction between the clutches; and an output-shaft-angular-acceleration acquiring submodule configured for acquiring an angular acceleration Grad of an output shaft of the vehicle; and the gear-shifting-inputted-rotational-speed determining module comprises:

a gear-shifting-rotational-speed-variation-value determining submodule configured for, according to the T1, the T2, the T3, the Grad, a first speed ratio R1 of a current gear of a dual-clutch automatic transmission and a second speed ratio R2 of a target gear of the dual-clutch automatic transmission, determining a gear-shifting rotational-speed variation value ΔRpm;

a preset-target-rotational-speed determining submodule configured for determining the preset target rotational speed Rpm corresponding to the target gear; and a gear-shifting-inputted-rotational-speed determining submodule configured for, according to the ΔRpm and the preset target rotational speed Rpm, determining the gear-shifting inputted rotational speed.

Optionally, the first-duration acquiring submodule comprises:

a current-working-condition acquiring unit configured for acquiring a current working condition of the vehicle; and a first-duration acquiring unit configured for, according to the current working condition, determining the first duration T1 corresponding to the gear engaging of the shifting fork;

the second-duration acquiring submodule comprises:

an oil-temperature acquiring unit configured for acquiring an oil temperature corresponding to the dual-clutch automatic transmission; and a second-duration acquiring unit configured for, according to the oil temperature, determining the second duration T2 corresponding to the oil charging of the clutches; and the third-duration acquiring submodule comprises:

an engine-throttle-opening acquiring unit configured for acquiring a throttle opening of an engine of the vehicle; and a third-duration acquiring unit configured for, according to the throttle opening of the engine, determining the third duration T3 corresponding to the torque interaction between the clutches.

A vehicle, wherein the vehicle comprises the device for controlling gear shifting stated above.

A computer program, wherein the computer program comprises a computer readable code, and when the computer readable code is executed on a calculating and processing device, the computer readable code causes the calculating and processing device to execute the method for controlling gear shifting stated above.

A computer readable medium, wherein the computer readable medium stores the computer program stated above.

As compared with the prior art, the method for controlling gear shifting according to the present disclosure has the following advantages:

The method for controlling gear shifting according to the embodiments of the present disclosure presets the target rotational speed of the gears, and, according to the current gear-shifting parameter of the vehicle that is acquired in real time and the preset target rotational speed, inversely calculates the gear-shifting inputted rotational speed, whereby the gear-shifting inputted rotational speed is an accurate gear-shifting inputted rotational speed that matches with the current condition of the vehicle. When the rotational speed of the vehicle reaches the gear-shifting inputted rotational speed, the shifting fork is controlled to start up a gear-shifting operation, which can realize the accurate gear shifting of the vehicle, which greatly improves the stability of the vehicle when a dual-clutch automatic transmission is performing gear shifting.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the embodiments of the present disclosure or the technical solutions in the prior art, the figures that are required to describe the embodiments or the prior art will be briefly introduced below. Apparently, the figures that are described below are merely embodiments of the present disclosure, and a person skilled in the art can obtain other figures according to these figures without paying creative work.

DETAILED DESCRIPTION

In order to make the objects, the technical solutions and the advantages of the embodiments of the present disclosure clearer, the technical solutions of the embodiments of the present disclosure will be clearly and completely described below with reference to the drawings in the embodiments of the present disclosure. Apparently, the described embodiments are certain embodiments of the present disclosure, rather than all of the embodiments. All of the other embodiments that a person skilled in the art obtains on the basis of the embodiments in the present disclosure without paying creative work fall within the protection scope of the present disclosure.

It should be noted that, subject to the avoiding of any conflict, the embodiments and the features of the embodiments of the present disclosure can be combined.

The present disclosure will be described in detail below with reference to the drawings and the embodiments.

Figure 1:
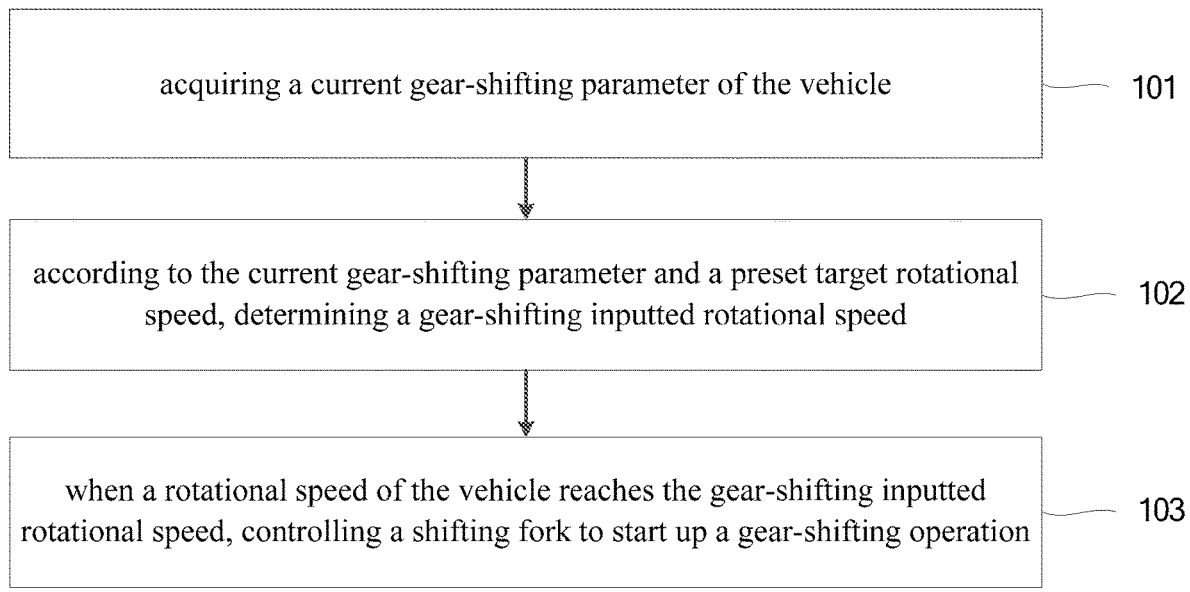
FIG. 1 is a flow chart of the steps of the method for controlling gear shifting according to an embodiment of the present disclosure.

FIG. 1 shows a flow chart of the steps of the method for controlling gear shifting according to an embodiment of the present disclosure, which is applied to a vehicle. The method comprises:

Step 101: acquiring a current gear-shifting parameter of the vehicle.

The embodiment of the present disclosure may be applied to an automatic-gearshift vehicle that has a wet-type dual-clutch transmission. The two sets of clutch discs of the wet-type dual clutches are located in a sealed oil tank, and by using the temperature of the transmission oil soaking the clutch discs the oil-charging duration of the clutches that is required by the gear shifting can be determined. The automatic-gearshift vehicle may automatically select the time point of gear shifting according to the actual driving condition of the vehicle.

In practical applications, the current gear-shifting parameter of the vehicle may be, as required by the vehicle in the current travelling state, the shifting-fork-gear-shifting duration, the clutch-oil-charging duration, the clutch-torque-interaction duration, the angular acceleration of the output shaft of the vehicle, and so on. The current gear-shifting parameter can feed back the gear-shifting duration that is practically required when the vehicle is performing a gear-shifting operation in the current travelling state, and so on.

Step 102: according to the current gear-shifting parameter and a preset target rotational speed, determining a gear-shifting inputted rotational speed.

In the embodiment of the present disclosure, the preset target rotational speed may be the target rotational speeds that are preset of the gears after the gear-shifting operation has been performed. For example, a car has totally six gears, and therefore the six target rotational speeds that correspond individually to the six gears when the gear-shifting operation is being performed may be individually set.

In practical applications, assuming that the vehicle is required to shift from second gear to third gear, then, according to the current gear-shifting parameter, for example, as required by the vehicle in the current travelling state, the shifting-fork-gear-shifting duration, the clutch-oil-charging duration, the clutch-torque-interaction duration, and the angular acceleration of the output shaft of the vehicle, and the target rotational speed that corresponds to the third gear, the gear-shifting inputted rotational speed that is required in the gear shifting is determined.

Step 103: when a rotational speed of the vehicle reaches the gear-shifting inputted rotational speed, controlling a shifting fork to start up a gear-shifting operation.

In practical applications, this step may comprise monitoring in real time the condition of the rotational speed of the vehicle, when the rotational speed of the vehicle reaches the gear-shifting inputted rotational speed, automatically controlling a shifting fork to start up a gear-shifting operation. Particularly, after the shifting-fork gear engaging has been started up, the operations of the clutches such as the oil charging and the torque interaction are sequentially performed, to complete the gear shifting.

In conclusion, the method for controlling gear shifting according to the embodiment of the present disclosure presets the target rotational speed of the gears, and, according to the current gear-shifting parameter of the vehicle that is acquired in real time and the preset target rotational speed, inversely calculates the gear-shifting inputted rotational speed, whereby the gear-shifting inputted rotational speed is an accurate gear-shifting inputted rotational speed that matches with the current condition of the vehicle. When the rotational speed of the vehicle reaches the gear-shifting inputted rotational speed, the shifting fork is controlled to start up a gear-shifting operation, which can realize the accurate gear shifting of the vehicle, which greatly improves the stability of the vehicle when a dual-clutch automatic transmission is performing gear shifting.

Figure 2:
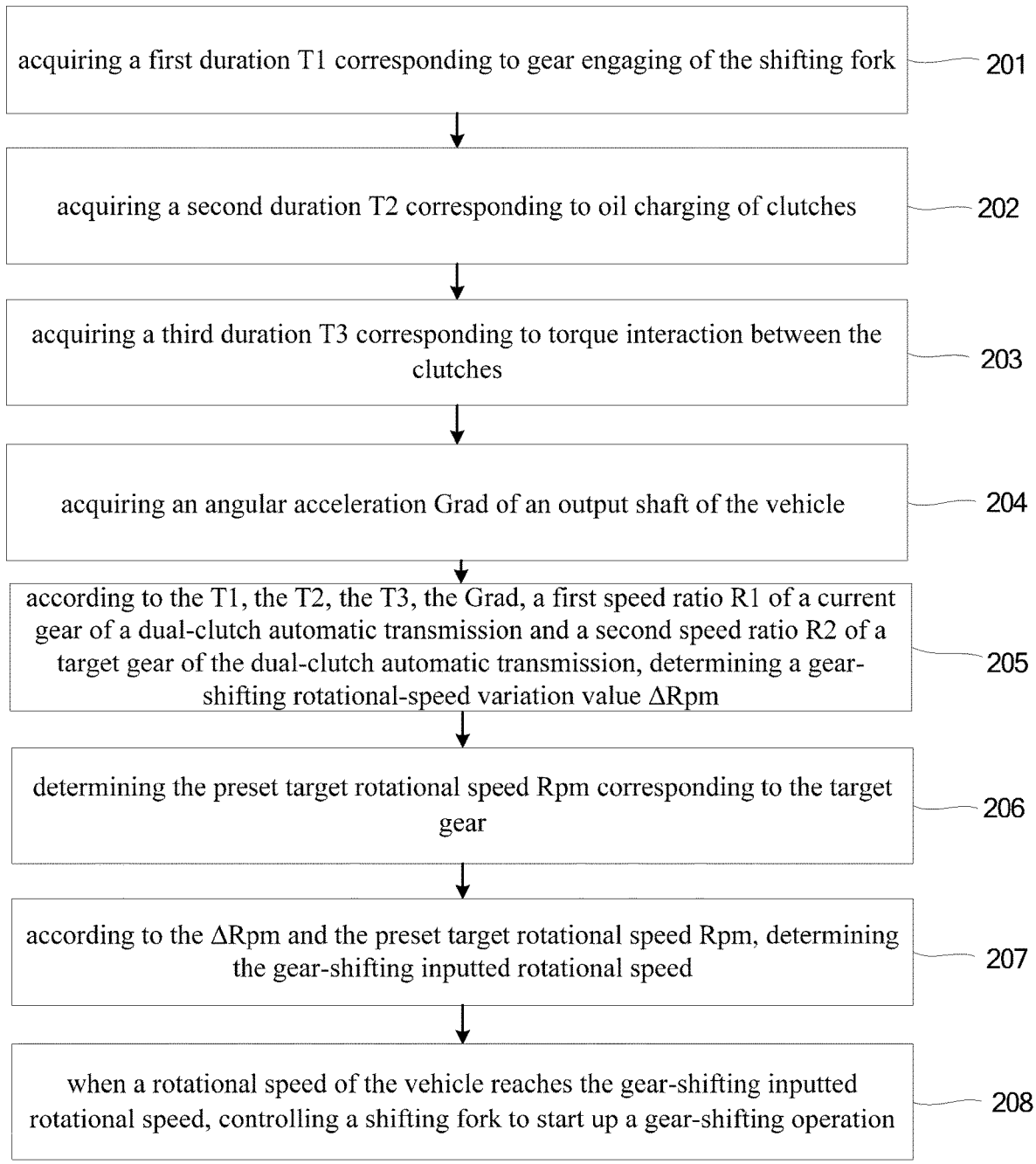
FIG. 2 is a flow chart of the particular steps of the method for controlling gear shifting according to an embodiment of the present disclosure.

FIG. 2 shows a flow chart of the particular steps of the method for controlling gear shifting according to an embodiment of the present disclosure, which is applied to a vehicle. The method particularly comprises:

Step 201: acquiring a first duration T1 corresponding to gear engaging of the shifting fork.

In the embodiment of the present disclosure, an implementation for acquiring the first duration T1 corresponding to the gear engaging of the shifting fork may be: acquiring a current working condition of the vehicle; and according to the current working condition, determining the first duration T1 corresponding to the gear engaging of the shifting fork.

In practical applications, the current working condition of the vehicle may be a gear-shifting type that is selected by the driver. The gear-shifting type may include low-speed gear shifting, regular gear shifting, high-speed gear shifting and so on. The gear-shifting type may be set according to the different driving modes, engine-torque levels, engine-speed levels and so on. Different gear-shifting types correspond to different shifting-fork-gear-engaging durations. In the process of driving, according to the acquired gear-shifting type that is currently selected by the driver, the first duration T1 corresponding to the gear engaging of the shifting fork may be determined.

It can be understood that a person skilled in the art may also, according to the practical application scene, employ any mode of acquiring the first duration corresponding to the gear engaging of the shifting fork, which is not limited by the embodiment of the present disclosure.

Step 202: acquiring a second duration T2 corresponding to oil charging of clutches.

In the embodiment of the present disclosure, an implementation for acquiring the second duration T2 corresponding to the oil charging of the clutches may be: acquiring an oil temperature corresponding to the dual-clutch automatic transmission; and according to the oil temperature, determining the second duration T2 corresponding to the oil charging of the clutches.

In practical applications, a dual-clutch-automatic-transmission controlling module sets different oil-charging durations according to the oil temperatures, and may, by acquiring the oil temperature corresponding to the dual-clutch automatic transmission, determine the second duration T2 corresponding to the oil charging of the clutches. For example, a second mapping table between the oil temperatures and the oil-charging durations is pre-established, and after the oil temperature has been acquired, the oil temperature is looked up in the second mapping table, thereby determining the second duration T2 corresponding to the oil charging of the clutches at the oil temperature.

It can be understood that a person skilled in the art may also, according to the practical application scene, employ any mode of acquiring the second duration corresponding to the oil charging of the clutches, which is not limited by the embodiment of the present disclosure.

Step 203: acquiring a third duration T3 corresponding to torque interaction between the clutches.

In the embodiment of the present disclosure, an implementation for acquiring the third duration T3 corresponding to the torque interaction between the clutches may be: acquiring a throttle opening of an engine of the vehicle; and according to the throttle opening of the engine, determining the third duration T3 corresponding to the torque interaction between the clutches.

In practical applications, the throttle opening refers to the angle of the opening of the throttle of the engine. A clutch controlling module sets different clutch-torque-interaction durations according to different throttle openings (or engine-torque levels). The third duration T3 corresponding to the torque interaction between the clutches may be determined by acquiring the throttle opening of the engine. For example, a third mapping table between the throttle openings of the engine and the clutch-torque-interaction durations is pre-established, and after the throttle opening of the engine has been acquired, the throttle opening of the engine is looked up in the third mapping table, thereby determining the third duration T3 corresponding to the torque interaction between the clutches at the throttle opening of the engine.

It can be understood that a person skilled in the art may also, according to the practical application scene, employ any mode of acquiring the third duration corresponding to the torque interaction between the clutches, which is not limited by the embodiment of the present disclosure.

Step 204: acquiring an angular acceleration Grad of an output shaft of the vehicle.

In practical applications, the output shaft is rigidly mechanically linked to the wheels of the vehicle, and the angular acceleration of the output shaft represents the acceleration of the entire vehicle. The angular acceleration Grad of the output shaft of the vehicle may be acquired by using a sensor and so on. By using the angular acceleration Grad of the output shaft, the actual angular acceleration of the input shaft can be determined. Particularly, because the clutch end and the engine end always have a certain slippage therebetween, the rated target gear-shifting rotational speed is actually not equal to the actual rotational speed of the engine, and a virtual input-shaft rotational speed that is reversely calculated from the rotational speed of the output shaft by using the speed ratio is required. Therefore, the angular acceleration of the virtual input shaft cannot be measured directly, and can be obtained by multiplying the angular acceleration of the output shaft by the speed ratio.

Step 205: according to the T1, the T2, the T3, the Grad, a first speed ratio R1 of a current gear of a dual-clutch automatic transmission and a second speed ratio R2 of a target gear of the dual-clutch automatic transmission, determining a gear-shifting rotational-speed variation value ΔRpm.

A particular method for determining the gear-shifting rotational-speed variation value ΔRpm according to the embodiment of the present disclosure may be:

according to a product of a sum of the T1 and the T2 times the Grad times the R1, obtaining a first variation;

according to a product of an average value between the Grad and an angular acceleration of the output shaft of the target gear times an average value between the R2 and the R1 times the T3, obtaining a second variation, wherein the angular acceleration of the output shaft of the target gear refers to a product of a ratio of the R2 to the R1 times the Grad; and summing the first variation and the second variation, to obtain the gear-shifting rotational-speed variation value ΔRpm.

Figure 3:
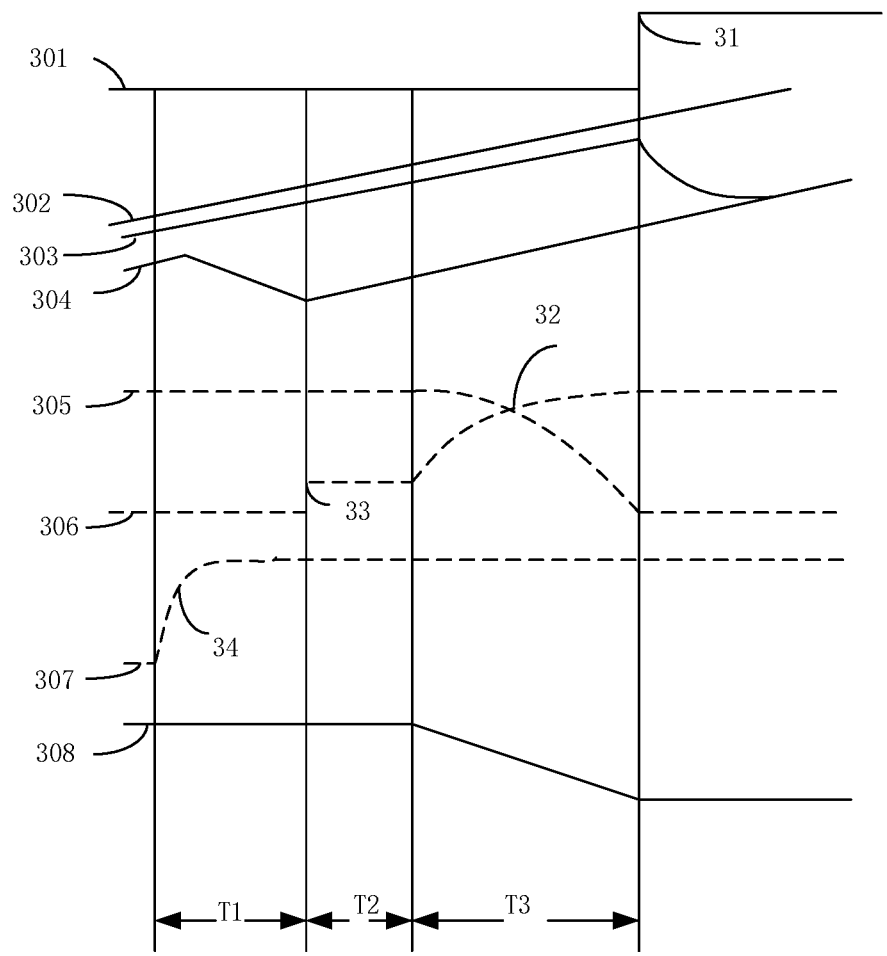
FIG. 3 is a schematic diagram of the gear-shifting process according to an embodiment of the present disclosure.

In practical applications, the controlling of the gear shifting from a lower gear to a higher gear is taken as an example. FIG. 3 shows a schematic diagram of the gear-shifting process, wherein the T1 phase is the phase of the action of the gear shifting by the shifting fork, the T2 is the phase of the oil charging of the clutches, and the T3 is the phase of the torque interaction between the clutches; 301 represents the gear; 302 represents the rotational speed of the working shaft at the current gear; 303 represents the rotational speed of the engine; 304 represents the rotational speed of the working shaft at the next target gear; 305 represents the current clutch torque; 306 represents the next target clutch torque; 307 represents the action of the shifting fork at the next target gear; 308 represents the gradient of the rotational speed of the output shaft; 31 represents the moment when the upshifting is completed; 32 represents the moment when the two clutches are performing torque interaction; 33 represents the moment of the next target action of the oil charging of the clutches; and 34 represents the moment of the action of the gear engaging of the shifting fork at the next target gear.

At the T1 phase, the action of the shifting fork at the next target gear 307 completes the shifting-fork operation at the moment of the action of the gear engaging of the shifting fork at the next target gear 34. At the initial of the T2 phase, the clutches are charged oil at the moment of the next target action of the oil charging of the clutches 33, and the next target clutch torque 306 starts to be engaged. At the start of the T3 phase, the current clutch torque 305 starts to be disengaged, and intersects with the next target clutch torque 306 at the moment when the two clutches are performing torque interaction 32, and then the next target clutch torque 306 continues to be engaged, and the current clutch torque 305 is gradually disengaged. At the end of the T3 phase, the gear 301 completes the upshifting operation at the moment when the upshifting is completed 31.

At the initial phase of the gear-shifting process, the engine-torque level is relatively stable, and therefore the angular acceleration of the output shaft is positively correlated with the "stable inputted torque*speed ratio". Therefore, at the first duration T1 corresponding to the phase of the gear engaging of the shifting fork of the gear and the second duration T2 corresponding to the phase of the oil charging of the clutches, both of the output shaft and the vehicle rigidly mechanically linked thereto are accelerated and decelerated by the driving of the "stable inputted torque*current-gear speed ratio R1", so the first variation of the rotational speed of the input shaft at the two phases is: the angular acceleration Grad of the output shaft times the current-gear speed ratio R1 times the sum of the first duration T1 and the second duration T2, which may be expressed as the formula Grad*R1*(T1+T2).

At the third duration T3 corresponding to the phase of the torque interaction between the clutches, the current clutch is gradually depressed to disengage, and the next clutch is gradually pressurized to engage. Therefore, the speed ratio at this phase is a process of cross gradual change of two stages of speed ratios, and the angular acceleration of the output shaft is changed by the driving of the "stable inputted torque*gradually changing speed ratio". At the moment of the start of the torque interaction between the clutches, the speed ratio and the angular acceleration of the output shaft are the same as those of the T2 phase; in other words, the angular acceleration of the output shaft is still Grad, and the speed ratio is still R1. At the moment of the completion of the interaction, the speed ratio has been completely changed into the next gear, and the output shaft is accelerated and decelerated by the driving of the "stable inputted torque*next-gear speed ratio R2". Therefore, at the moment, the angular acceleration of the output shaft is in direct proportion to the total torque; in other words, the angular acceleration of the output shaft of the target gear is Grad*(R2/R1). The normal torque interaction may be considered as of a symmetrical intersection type, so the average speed ratio of the interaction process may be considered as the average value of the speed ratios at the initial moment and the end moment, i.e., (R1+R2)/2. In the same manner, the angular acceleration of the output shaft should be the average value of the angular accelerations at the initial moment and the end moment, i.e., [Grad+Grad*(R2/R1)]/2. Therefore, the second variation of the rotational speed of the input shaft at the phase of the torque interaction is: the equivalent angular acceleration of the output shaft [Grad+Grad*(R2/R1)]/2 times the equivalent speed ratio (R1+R2)/2 times the interaction duration T3.

In practical applications, the formula for determining the ΔRpm may be:

$$\Delta Rpm = Grad*R1*(T1+T2) + [Grad+Grad*(R2/R1)]/2*(R1+R2)/2*T3$$

Step 206: determining the preset target rotational speed Rpm corresponding to the target gear.

In the embodiment of the present disclosure, the target gear after the gear-shifting operation may be determined by using the current gear of the vehicle. In practical applications, when an upshifting operation is being performed, the target gear may be the gear higher by one than the current gear, and when a downshifting operation is being performed, the target gear may be the gear lower by one than the current gear. A person skilled in the art may determine the target gear according to the practical situation, and in turn determine the target rotational speed Rpm corresponding to the target gear that is in advance rated, which is not limited by the embodiment of the present disclosure.

Step 207: according to the ΔRpm and the preset target rotational speed Rpm, determining the gear-shifting inputted rotational speed.

In the embodiment of the present disclosure, after the ΔRpm and the Rpm have been determined, when an upshifting operation is being performed, the gear-shifting inputted rotational speed may be Rpm−ΔRpm, and when a downshifting operation is being performed, the gear-shifting inputted rotational speed may be Rpm+ΔRpm. A person skilled in the art may determine the gear-shifting inputted rotational speed according to the practical situation, which is not limited by the embodiment of the present disclosure.

Step 208: when a rotational speed of the vehicle reaches the gear-shifting inputted rotational speed, controlling a shifting fork to start up a gear-shifting operation.

In conclusion, the embodiment of the present disclosure may be applied to the accurate controlling of the gear-shifting moment of the dual-clutch transmission. In practical applications, the transmission control unit may use the dynamic shifting-fork-gear-engaging duration T1, the clutch-oil-charging duration T2, the clutch-torque-interaction duration T3, the real-time output-shaft angular acceleration Grad and the transmission ratios R1 and R2 of the current gear and the next gear as the inputted information, to in real time calculate out the difference of the rotational-speed variations of the input shaft during the entire gear-shifting process, thereby inversely calculating the value of the rotational speed at the starting moment of the gear shifting. When the rotational speed of the vehicle reaches the gear-shifting inputted rotational speed, the shifting fork is controlled to start up a gear-shifting operation, which can realize the accurate gear shifting of the vehicle, which greatly improves the stability of the vehicle when a dual-clutch automatic transmission is performing gear shifting.

Figure 4:
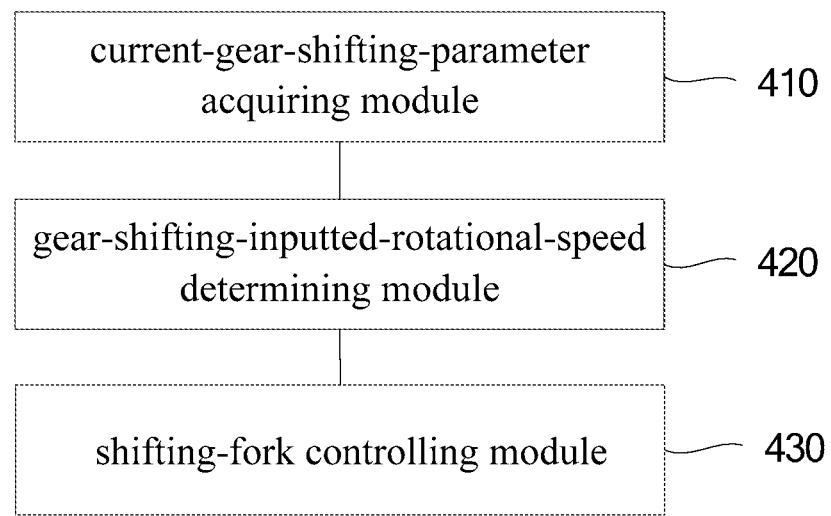
FIG. 4 is a structural block diagram of the device for controlling gear shifting according to an embodiment of the present disclosure.

FIG. 4 shows a structural block diagram of the device for controlling gear shifting according to an embodiment of the present disclosure, which is applied to a vehicle. The device particularly comprises:

a current-gear-shifting-parameter acquiring module 410 configured for acquiring a current gear-shifting parameter of the vehicle;

a gear-shifting-inputted-rotational-speed determining module 420 configured for, according to the current gear-shifting parameter and a preset target rotational speed, determining a gear-shifting inputted rotational speed; and a shifting-fork controlling module 430 configured for, when a rotational speed of the vehicle reaches the gear-shifting inputted rotational speed, controlling a shifting fork to start up a gear-shifting operation.

Figure 5:
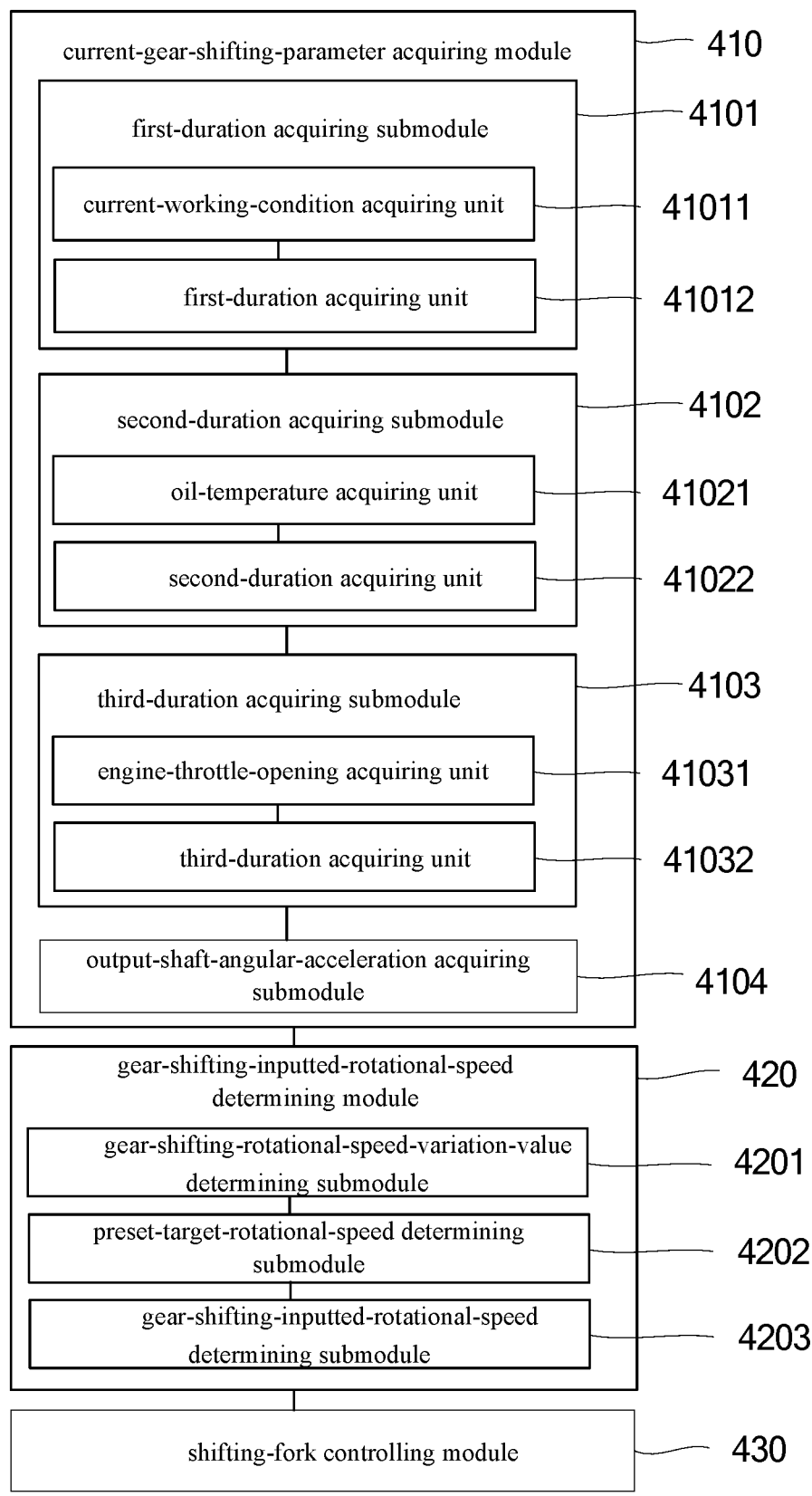
FIG. 5 is a particular structural block diagram of the device for controlling gear shifting according to an embodiment of the present disclosure.

FIG. 5 shows a structural block diagram of the device for controlling gear shifting according to an embodiment of the present disclosure. On the basis of FIG. 4, in the device:

the current-gear-shifting-parameter acquiring module 410 comprises:

a first-duration acquiring submodule 4101 configured for acquiring a first duration T1 corresponding to gear engaging of the shifting fork;

a second-duration acquiring submodule 4102 configured for acquiring a second duration T2 corresponding to oil charging of clutches;

a third-duration acquiring submodule 4103 configured for acquiring a third duration T3 corresponding to torque interaction between the clutches; and an output-shaft-angular-acceleration acquiring submodule 4104 configured for acquiring an angular acceleration Grad of an output shaft of the vehicle; and the gear-shifting-inputted-rotational-speed determining module 420 comprises:

a gear-shifting-rotational-speed-variation-value determining submodule 4201 configured for, according to the T1, the T2, the T3, the Grad, a first speed ratio R1 of a current gear of a dual-clutch automatic transmission and a second speed ratio R2 of a target gear of the dual-clutch automatic transmission, determining a gear-shifting rotational-speed variation value ΔRpm;

a preset-target-rotational-speed determining submodule 4202 configured for determining the preset target rotational speed Rpm corresponding to the target gear; and a gear-shifting-inputted-rotational-speed determining submodule 4203 configured for, according to the ΔRpm and the preset target rotational speed Rpm, determining the gear-shifting inputted rotational speed.

The first-duration acquiring submodule 4101 comprises:

a current-working-condition acquiring unit 41011 configured for acquiring a current working condition of the vehicle; and a first-duration acquiring unit 41012 configured for, according to the current working condition, determining the first duration T1 corresponding to the gear engaging of the shifting fork.

The second-duration acquiring submodule 4102 comprises:

an oil-temperature acquiring unit 41021 configured for acquiring an oil temperature corresponding to the dual-clutch automatic transmission; and a second-duration acquiring unit 41022 configured for, according to the oil temperature, determining the second duration T2 corresponding to the oil charging of the clutches.

The third-duration acquiring submodule 4103 comprises:

an engine-throttle-opening acquiring unit 41031 configured for acquiring a throttle opening of an engine of the vehicle; and a third-duration acquiring unit 41032 configured for, according to the throttle opening of the engine, determining the third duration T3 corresponding to the torque interaction between the clutches.

The embodiments of the present disclosure preset the target rotational speed of the gears, and, according to the current gear-shifting parameter of the vehicle that is acquired in real time and the preset target rotational speed, inversely calculate the gear-shifting inputted rotational speed, whereby the gear-shifting inputted rotational speed is an accurate gear-shifting inputted rotational speed that matches with the current condition of the vehicle. When the rotational speed of the vehicle reaches the gear-shifting inputted rotational speed, the shifting fork is controlled to start up a gear-shifting operation, which can realize the accurate gear shifting of the vehicle, which greatly improves the stability of the vehicle when a dual-clutch automatic transmission is performing gear shifting.

A person skilled in the art can clearly understand that, in order for the convenience and concision of the description, the particular working processes of the above-described systems, devices and units may refer to the corresponding processes of the above-described process embodiments, and are not repeatedly here.

The above descriptions are merely preferable embodiments of the present disclosure, and are not limiting the present disclosure. Any modifications, equivalent substitutions and improvements that are made within the spirit and principle of the present disclosure should fall within the protection scope of the present disclosure.

The above-described device embodiments are merely schematic. The units described as separate components may be or may not be physically separated. The components shown as units may be or may not be physical units; in other words, they may be located at one place, or may also be distributed at a plurality of network elements. Some or all of the modules among them may be selected according to the practical demands to realize the purpose of the embodiments. A person skilled in the art can understand and implement them without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for executing part of or the whole of the method described herein. Such programs for implementing the present disclosure may be stored in a computer readable medium, or may be in the form of one or more signals. Such signals may be downloaded from Internet websites, or provided on a carrier signal, or provided in any other forms.

Figure 6:
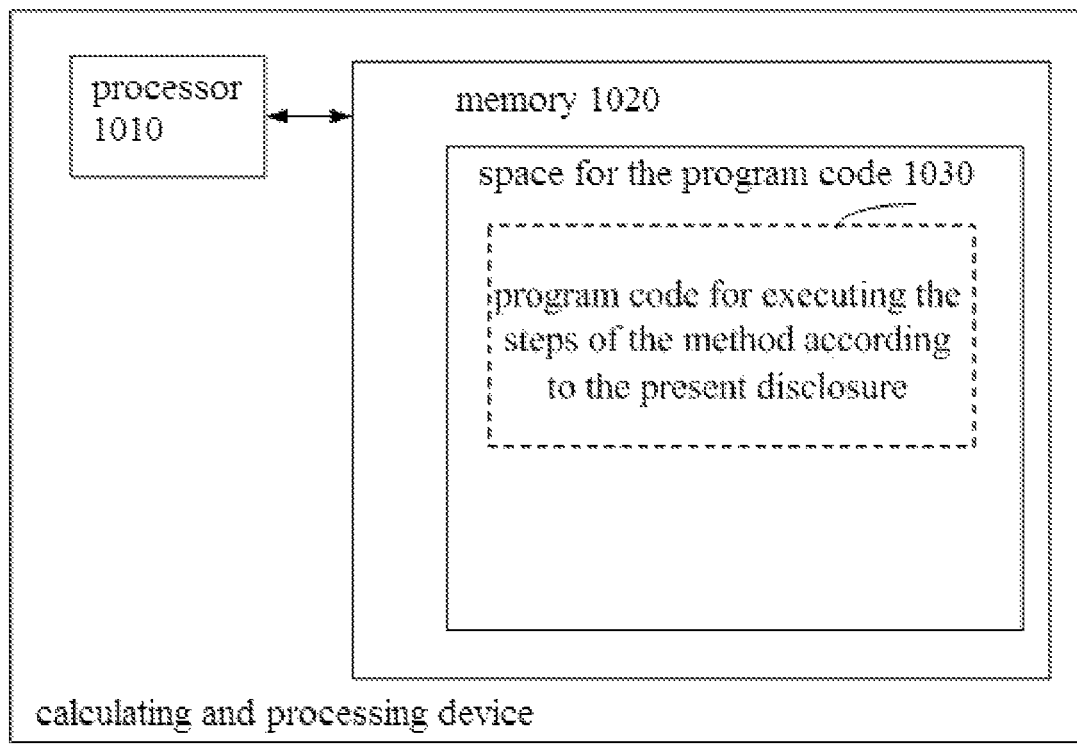
FIG. 6 schematically shows a block diagram of a calculating and processing device for executing the method according to the present disclosure.
Figure 7:
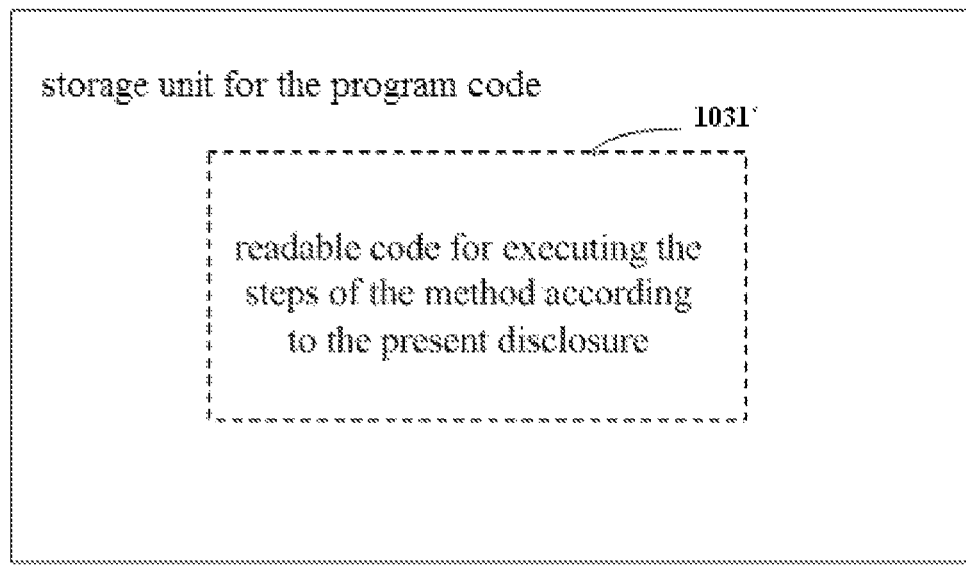
FIG. 7 schematically shows a storage unit for maintaining or carrying a program code of implementing the method according to the present disclosure.

For example, FIG. 6 shows a calculating and processing device that can implement the method according to the present disclosure. The calculating and processing device traditionally comprises a processor 1010 and a computer program product or computer readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for executing any steps of the above method. For example, the storage space 1030 for program code may include program codes 1031 for individually implementing each of the steps of the above method. Those program codes may be read from one or more computer program products or be written into the one or more computer program products. Those computer program products comprise program code carriers such as hard disk, compact disk (CD), memory card or floppy disk. Such computer program products are usually the portable or fixed storage unit as shown in FIG. 7. The storage unit may have storage segments or storage spaces with similar arrangement to the memory 1020 of the calculating and processing device in FIG. 6. The program codes may for example be compressed in a suitable form. Generally, the storage unit includes a computer readable code 1031', which can be read by a processor like the processor 1010. When those codes are operated by the calculating and processing device, the codes cause the calculating and processing device to execute each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses cannot bring about limitation to the claims. The word "comprise" does not exclude the elements or steps that are not listed in the claims. The word "a" or "an" preceding an element does not exclude the existing of a plurality of such elements. The present disclosure may be implemented by means of hardware comprising several distinct elements and by means of suitably programmed computers. In unit claims that list several devices, some of those devices may be embodied by the same item of hardware. The words first, second, and third, etc. do not denote any order. These words can be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

What is claimed is:

1. A method for controlling gear shifting, wherein the method is applied to a vehicle, the vehicle comprises a dual-clutch automatic transmission, and the method comprises:
   acquiring a current gear-shifting parameter of the vehicle;
   according to the current gear-shifting parameter and a preset target rotational speed, determining a gear-shifting inputted rotational speed; and
   when a rotational speed of the vehicle reaches the gear-shifting inputted rotational speed, controlling a shifting fork to start up a gear-shifting operation;
   wherein
   the step of acquiring the current gear-shifting parameter of the vehicle comprises:
   acquiring a first duration T1 corresponding to gear engaging of the shifting fork;
   acquiring a second duration T2 corresponding to oil filling of clutches;
   acquiring a third duration T3 corresponding to torque swap between the clutches; and
   acquiring an angular acceleration Grad of an output shaft of the vehicle; and
   the step of, according to the current gear-shifting parameter and the preset target rotational speed, determining the gear-shifting inputted rotational speed comprises:
   according to the T1, the T2, the T3, the Grad, a first speed ratio R1 of a current gear of a dual-clutch automatic transmission and a second speed ratio R2 of a target gear of the dual-clutch automatic transmission, determining a gear-shifting rotational-speed variation value ΔRpm;
   determining the preset target rotational speed Rpm corresponding to the target gear; and
   according to the ΔRpm and the preset target rotational speed Rpm, determining the gear-shifting inputted rotational speed.

2. The method according to claim 1, wherein the step of acquiring the first duration T1 corresponding to the gear engaging of the shifting fork comprises:
   acquiring a current working condition of the vehicle; and
   according to the current working condition, determining the first duration T1 corresponding to the gear engaging of the shifting fork.

3. The method according to claim 1, wherein the step of acquiring the second duration T2 corresponding to the oil filling of the clutches comprises:
   acquiring an oil temperature corresponding to the dual-clutch automatic transmission; and
   according to the oil temperature, determining the second duration T2 corresponding to the oil filling of the clutches.

4. The method according to claim 1, wherein the step of acquiring the third duration T3 corresponding to the torque swap between the clutches comprises:
   acquiring a throttle opening of an engine of the vehicle; and
   according to the throttle opening of the engine, determining the third duration T3 corresponding to the torque swap between the clutches.

5. The method according to claim 1, wherein the step of, according to the T1, the T2, the T3, the Grad, the first speed ratio R1 of the current gear of the dual-clutch automatic transmission and the second speed ratio R2 of the target gear of the dual-clutch automatic transmission, determining the gear-shifting rotational-speed variation value ΔRpm comprises:
   according to a product of a sum of the T1 and the T2 times the Grad times the R1, obtaining a first variation;
   according to a product of an average value between the Grad and an angular acceleration of the output shaft of the target gear times an average value between the R2 and the R1 times the T3, obtaining a second variation, wherein the angular acceleration of the output shaft of the target gear refers to a product of a ratio of the R2 to the R1 times the Grad; and
   summing the first variation and the second variation, to obtain the gear-shifting rotational-speed variation value ΔRpm.

6. A device for controlling gear shifting, wherein the device is applied to a vehicle, the vehicle comprises a dual-clutch automatic transmission, and the device comprises:
   a current-gear-shifting-parameter acquiring module configured for acquiring a current gear-shifting parameter of the vehicle;
   a gear-shifting-inputted-rotational-speed determining module configured for, according to the current gear-shifting parameter and a preset target rotational speed, determining a gear-shifting inputted rotational speed; and
   a shifting-fork controlling module configured for, when a rotational speed of the vehicle reaches the gear-shifting inputted rotational speed, controlling a shifting fork to start up a gear-shifting operation;
   wherein
   the current-gear-shifting-parameter acquiring module comprises:
   a first-duration acquiring submodule configured for acquiring a first duration T1 corresponding to gear engaging of the shifting fork;
   a second-duration acquiring submodule configured for acquiring a second duration T2 corresponding to oil filling of clutches;
   a third-duration acquiring submodule configured for acquiring a third duration T3 corresponding to torque swap between the clutches; and
   an output-shaft-angular-acceleration acquiring submodule configured for acquiring an angular acceleration Grad of an output shaft of the vehicle; and
   the gear-shifting-inputted-rotational-speed determining module comprises:
   a gear-shifting-rotational-speed-variation-value determining submodule configured for, according to the T1, the T2, the T3, the Grad, a first speed ratio R1 of a current gear of a dual-clutch automatic transmission and a second speed ratio R2 of a target gear of the dual-clutch automatic transmission, determining a gear-shifting rotational-speed variation value ΔRpm;

a preset-target-rotational-speed determining submodule configured for determining the preset target rotational speed Rpm corresponding to the target gear; and a gear-shifting-inputted-rotational-speed determining submodule configured for, according to the ΔRpm and the preset target rotational speed Rpm, determining the gear-shifting inputted rotational speed.

7. The device according to claim 6, wherein the first-duration acquiring submodule comprises:

a current-working-condition acquiring unit configured for acquiring a current working condition of the vehicle; and a first-duration acquiring unit configured for, according to the current working condition, determining the first duration T1 corresponding to the gear engaging of the shifting fork;

the second-duration acquiring submodule comprises:

an oil-temperature acquiring unit configured for acquiring an oil temperature corresponding to the dual-clutch automatic transmission; and a second-duration acquiring unit configured for, according to the oil temperature, determining the second duration T2 corresponding to the oil filling of the clutches; and the third-duration acquiring submodule comprises:

an engine-throttle-opening acquiring unit configured for acquiring a throttle opening of an engine of the vehicle; and a third-duration acquiring unit configured for, according to the throttle opening of the engine, determining the third duration T3 corresponding to the torque swap between the clutches.

8. A vehicle, wherein the vehicle comprises the device for controlling gear shifting according to any one of claims 6 and 7.

* * * * *